United States Patent [19]

Brewer

[11] Patent Number: 4,683,908

[45] Date of Patent: Aug. 4, 1987

[54] ECCENTRIC FLOAT APPARATUS

[76] Inventor: Daniel J. Brewer, 4211 Austin Ave., Brownwood, Tex. 76801

[21] Appl. No.: 928,030

[22] Filed: Nov. 7, 1986

[51] Int. Cl.[4] ..................... F16K 33/00; F16K 31/18
[52] U.S. Cl. ................................. 137/426; 73/322.5; 4/324; 4/395; 4/DIG. 1
[58] Field of Search ............... 73/332.5; 137/426, 410, 137/434; 4/DIG. 1, 324, 325, 395

[56] References Cited

U.S. PATENT DOCUMENTS

| | | | |
|---|---|---|---|
| 1,049,131 | 12/1912 | Moritzky | 137/426 |
| 1,341,002 | 5/1920 | Wright | 73/322.5 |
| 1,487,477 | 3/1924 | Ross | 137/426 |
| 2,847,025 | 8/1958 | Reitman | 137/426 |
| 3,194,070 | 7/1965 | Grant | 73/322.5 |
| 3,354,719 | 11/1967 | Taylor et al. | 73/322.5 |
| 4,167,951 | 9/1979 | Hume | 137/426 |
| 4,574,832 | 3/1986 | Wright | 137/426 |

FOREIGN PATENT DOCUMENTS 701028  3/1931  France ........................ 137/426

Primary Examiner—George L. Walton
Attorney, Agent, or Firm—Arthur F. Zobal

[57] ABSTRACT

The float is employed for controlling the valve of a water tank of a toilet for regulating the water level. The float has a solid core with wall structure extending therefrom forming a sealed chamber located on one side of the core. An aperture extends through the core. The volume of the chamber is greater than the volume of the core and the chamber and most of the volume of the float is located on one side of the aperture. The aperture will receive the free end of a rod which is connected to the valve. The float may be rotated around the rod and secured thereto at different angular positions to select the desired water level at which the valve is closed.

9 Claims, 3 Drawing Figures

4,683,908

ECCENTRIC FLOAT APPARATUS

BACKGROUND OF THE INVENTION

1. Field of the Invention

The invention relates to a float for controlling a valve of a water tank of a toilet for regulating the water level.

2. Description of the Prior Art

U.S. Pat. Nos. 330,843, 1,049,131, 1,177,963 1,341,002, 3,932,900, and 4,167,951 disclose different types of floats for controlling a valve for regulating the water level in a water tank of a toilet.

SUMMARY OF THE INVENTION

It is an object of the invention to provide a new and useful apparatus for use for controlling a valve of a water tank of a toilet for regulating the water level.

The apparatus comprises a float member having an aperture for receiving one end of a rod which is connected to the valve in the water tank. Most of the volume of the float member is located on one side of the aperture. The float member may be rotated around the rod and secured thereto at different angular positions to select the desired water level at which the valve is closed.

In the preferred embodiment, the float member comprises a solid portion in which the aperture is formed and a sealed chamber located on one side of the solid portion and hence on one side of the aperture. The volume of the sealed chamber is greater than the volume of the solid portion.

DESCRIPTION OF THE PREFERRED EMBODIMENT

Figure 1:
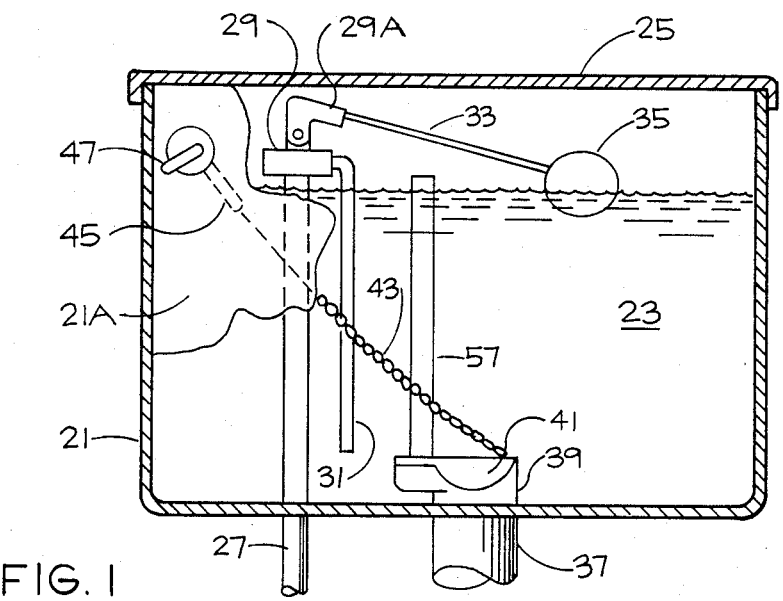
FIG. 1 is a cross-sectional view of a water tank of a toilet or commode illustrating interior components thereof.

Referring to FIG. 1, there is illustrated at 21 a conventional box-like tank 21 for holding water 23 for use for flushing a tiolet (not shown). The top of the tank 21 has a removable cover 25. Water is supplied to the interior of the tank 21 through a pipe 27 extending through the bottom of the tank 21, a conventional float operated valve 29 at the top of the pipe 27, and a pipe 31 extending from the valve 29 to a position near the bottom of the tank 21. A rod 33 has one end coupled to a movable arm 29A of the valve and the float 35 of the invention is coupled to the other end of the rod for closing the valve 29 when the water level rises and reaches a certain level.

A flush pipe 37 has one end connected to the toilet bowl (not shown) with the opposite end extending through the bottom of the tank 21. Inside the tank 21, the end of the pipe 37 has a valve seat member 39 with a valve member 41 pivotally coupled thereto. A flexible chain 43 has one end coupled to the valve member 41 and an opposite end coupled to an arm 45 which in turn is fixedly connected to a handle 47 for rotation therewith. The handle 47 is located outside of the tank 21 and is connected to the arm 45 by way of a rod (not shown) which extends through the front wall 21A of the tank 21. Rotation of the handle 47 and hence the arm 45 in a counter-clockwise direction as seen in FIG. 1 causes the chain 43 to pivot the valve member 41 away from the seat member 39 to permit water 23 from the tank 21 to flow through the pipe 37 to flush the toilet bowl. When the tank 21 is nearly empty, the valve member 41 closes by gravity allowing the tank to be refilled with water. As the water level falls, the float 35 and the rod 33 are lowered causing the valve 29 to open allowing water to flow into the tank 21 until the water level reaches a given level as set by the position of the float 35 at which level the valve 29 is closed by action of the rod 33.

A vertical overflow pipe 51 projects upwardly from the valve seat member 39 to a level above the normal level of the water to allow water from its upper end to drain into the flush pipe 37 should the water level rise above the pipe 51 and hence above the normal level, to prevent overflow of water by way of the top of the tank 21.

Figure 2:
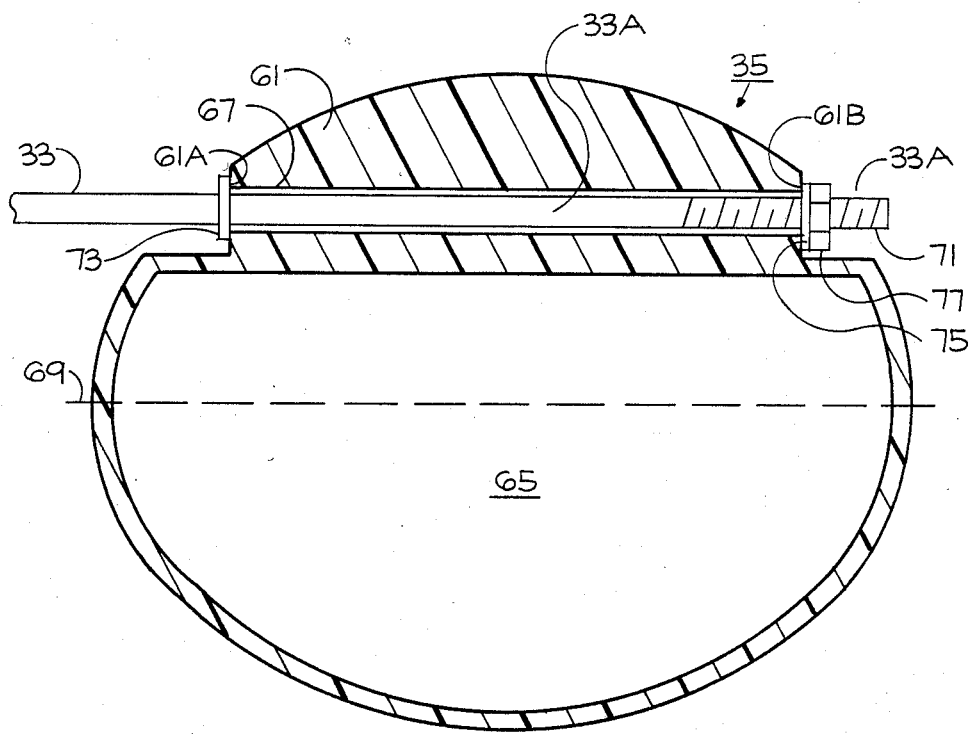
FIG. 2 is a cross-sectional side view of the float of the invention.
Figure 3:
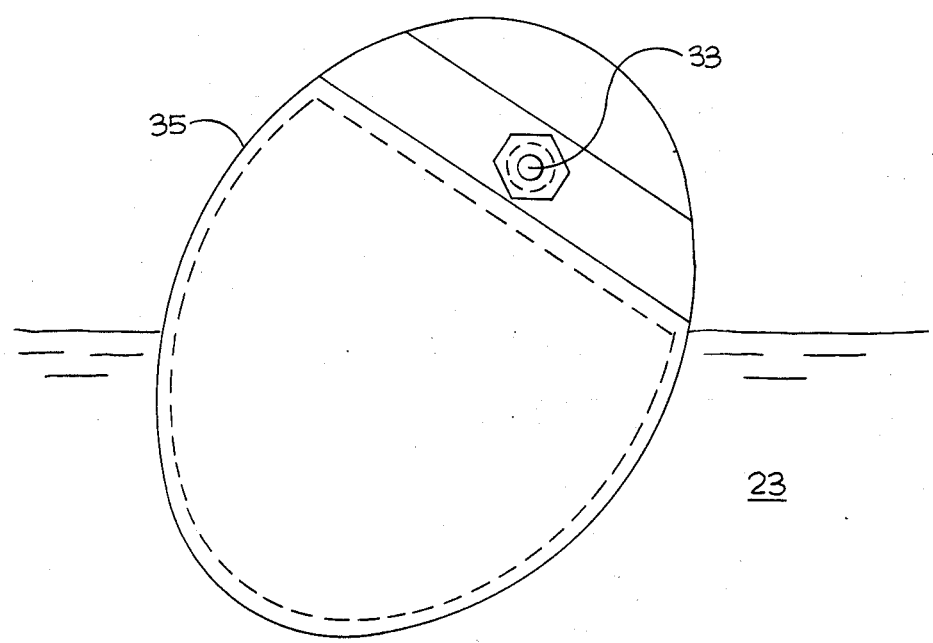
FIG. 3 is an end view of the float of the invention.

Referring to FIGS. 2 and 3, there will be described the float 35 of the invention. It comprises a solid core 61 with wall structure 63 extending therefrom forming a sealed chamber 65 located on one side of the core 61. The core 61 and wall structure 63 may be formed of a suitable hard plastic. The core 61 has a cylindrical shaped aperture 67 extending therethrough which is offset from and parallel the elongated axis 69 of the float 35. The volume of the chamber 65 is greater than the volume of the core 61 and the chamber 65 and most of the volume of the float is located on one side of the aperture 65.

The core 61 has opposite flat sides 61A and 61B through which the aperture 67 extends. The rod 33 is cylindrical in shape and has threads 71 formed at its end 33A. A washer 73 is fixedly secured to the rod 33 at a position spaced from the threads 33A. The free end portion of the rod 33 can be inserted through the aperture 67 until the washer 73 engages the wall 61A. In this position, the threaded end 33A of the rod extends beyond the aperture 67 and the float 35 can be releasably secured to the rod 33 with a lock washer 75 and a lock nut 77 screwed to the threads 71 until the washer 75 tightly engages the wall 61B.

The float 35 may be rotated about the rod 33 and secured thereto at different angular positions in order to raise or lower the water level at which the float 35 and rod 33 will cause the valve 29 to close. For example, if the float 35 is secured to the rod 33 at a selected position clockwise from that shown in FIG. 3, the water level at which the valve 29 will be closed will be raised. If the float is secured to the rod 33 at a selected position counterclockwise from that shown in FIG. 3, the water level at which the valve 29 will be closed will be lowered. Rotation and securement of the float 35 to the rod 33 can be readily carried out to achieve the desired water level in the tank 21.

In one embodiment, the float 35 may have a length along its axis 69 of about 5½ inches and dimensions of about 4¼ inches and 3¼ inches for its height and width.

What is claimed is:

1. An apparatus for controlling a float operated valve means of a water tank of a toilet for regulating the water level in the tank, comprising:

a float member capable of floating in water, said float member having a central axis along a given dimension, said float member having an aperture for receiving one end of a rod means with the other end of the rod means being connectable to the valve means in the water tank, said aperture being offset from said central axis whereby the length of the rod means when located in said aperture is offset from said central axis, when said rod means is located in said aperture, said float member and hence the portion of said float member between said aperture and said central axis are rotatable about said rod means whereby said float member can be secured to said rod means to locate said portion of said float member between said aperture and said central axis at different angular positions relative to said rod means.

2. The apparatus of claim 1, wherein:

said float member comprises a sealed hollow chamber located to one side of said aperture with no entrance thereto from the exterior.

3. An apparatus for controlling a float operated valve means of a water tank of a toilet for regulating the water level in the tank comprising:

a float member capable of floating in water, a rod means, said float member having an aperture for receiving one end of said rod means with the other end of the rod means being connectable to the valve means in the water tank, most of the volume of said float member being located on one side of said aperture, when said rod means is located in said aperture, said float member and hence the volume of said float member on said one side of said aperture are rotatable about said rod means whereby said float member; can be secured to said rod means to locate said volume of said float member on said one side of said aperture at different angular positions relative to said rod means, and means for releasably securing said float member to said rod means to locate said volume of said float member on said one side of said aperture at a selected angular position relative to said rod means.

4. The apparatus of claim 3, wherein:

said float member comprises a sealed hollow chamber located to one side of said aperture with no entrance thereto from the exterior.

5. An apparatus for controlling a float operated valve means of a water tank of a toilet for regulating the water level in the tank, comprising:

a float member capable of floating in water, said float member having a solid portion with an aperture formed therethrough for receiving one end of a rod means with the other end of the rod means being connectable to the valve means in the water tank, said float member having a sealed chamber located on one side of said solid portion with the volume of said chamber being greater than the volume of said solid portion, when said rod means is located in said aperture, said float member and hence said sealed chamber are rotatable about said rod means whereby said float member can be secured to said rod means to locate said sealed chamber at different angular positions relative to said rod means.

6. The apparatus of claim 5, wherein:

said sealed chamber has no entrance thereto from the exterior.

7. An apparatus for controlling a float operated valve means of a water tank of a toilet for regulating the water level in the tank, comprising:

a float member capable of floating in water, a rod means, said float member having a solid portion with an aperture formed therethrough for receiving one end of said rod means with the other end of the rod means being connectable to the valve means in the water tank, said float member having a sealed chamber located on one side of said solid portion with the volume of said chamber being greater than the volume of said solid portion, when said rod means is located in said aperture, said float member and hence said sealed chamber are rotatable about said rod means whereby said float member can be secured to said rod means to locate said sealed chamber at different angular positions relative to said rod means, and means for releasably securing said float member to said rod means to locate said sealed chamber at a selected angular position relative to said rod means.

8. The apparatus of claim 7, wherein:

said sealed chamber has no entrance thereto from the exterior.

9. The apparatus of claim 8 in combination with said valve means in said water tank with said other end of said rod means being connected to said valve means.

* * * * *